(12) United States Patent
Chan et al.

(10) Patent No.: US 7,687,139 B2
(45) Date of Patent: Mar. 30, 2010

(54) FLAME LAMINABLE HYDROPHILIC ESTER POLYURETHANE FOAMS

(75) Inventors: Chiu Y. Chan, Wilmington, DE (US); Sharon A. Free, Wallingford, PA (US); Joshua D. Land, Media, PA (US); Marc J. Albero, Springfield, PA (US); Jagdish Patel, Sewell, NJ (US); William Patrick Burke, III, Selane, PA (US)

(73) Assignee: Foamex Innovations Operating Company, Media, PA (US)

( * ) Notice: Subject to any disclaimer, the term of this patent is extended or adjusted under 35 U.S.C. 154(b) by 36 days.

(21) Appl. No.: 12/037,196

(22) Filed: Feb. 26, 2008

(65) Prior Publication Data

US 2008/0213566 A1   Sep. 4, 2008

Related U.S. Application Data

(62) Division of application No. 10/885,481, filed on Jul. 6, 2004, now abandoned.

(51) Int. Cl.
*B32B 3/00* (2006.01)
*B32B 3/26* (2006.01)

(52) U.S. Cl. .................................. 428/316.6

(58) Field of Classification Search ............... 428/316.6
See application file for complete search history.

(56) References Cited

U.S. PATENT DOCUMENTS

| | | | |
|---|---|---|---|
| 3,855,048 A | 12/1974 | Bagnall | |
| 4,060,439 A | 11/1977 | Rosemund et al. | |
| 4,147,829 A | 4/1979 | Holland | |
| 4,247,348 A * | 1/1981 | Lischer ........................ | 156/79 |
| 4,616,044 A | 10/1986 | Fesman | |
| 5,114,784 A | 5/1992 | Van de Ven et al. | |
| 5,891,928 A | 4/1999 | Chakrabarti et al. | |
| 5,900,087 A | 5/1999 | Chakrabarti et al. | |
| 5,981,020 A | 11/1999 | Sutherland et al. | |
| 6,589,646 B1 | 7/2003 | Morgenstern | |
| 6,756,416 B2 | 6/2004 | Free et al. | |
| 2002/0036049 A1 | 3/2002 | Herzog et al. | |
| 2002/0197442 A1 | 12/2002 | Wyner et al. | |

* cited by examiner

*Primary Examiner*—Norca L Torres-Velazquez
(74) *Attorney, Agent, or Firm*—Connolly Bove Lodge & Hutz LLP

(57) ABSTRACT

A hydrophilic ester polyurethane foam is flame laminated to a substrate using a thin sacrificial layer, preferably a sacrificial foam layer. The sacrificial layer in the resulting laminate structure has a thickness of 1.5 mm or less, and preferably is substantially burnt away. The resulting laminate exhibits good bond strength along its length and width without loss of liquid wicking and absorptive properties.

9 Claims, No Drawings

FLAME LAMINABLE HYDROPHILIC ESTER POLYURETHANE FOAMS

CROSS-REFERENCE TO RELATED APPLICATION

This application is a divisional of U.S. patent application Ser. No. 10/885,481, filed Jul. 6, 2004, now pending.

This invention relates to improving the flame laminability for certain ester polyurethane foams which are more difficult to bond to substrates by flame lamination after such foams have been chemically modified to improve liquid absorption and wicking characteristics. The foams may be incorporated into articles used to wipe and absorb liquids, such as household cleaning sponges and mop heads.

BACKGROUND OF THE INVENTION

Polyurethane foams are generally prepared by the reaction of an active hydrogen-containing compound (i.e., a polyol) and a polyisocyanate, in the presence of a blowing agent such as water, and usually a reaction catalyst and foam stabilizer. The cellular polymer structure of polyurethane foam has a skeletal framework of relatively heavy strands forming an outline for the cell structure. The skeletal framework strands are connected by very thin membranes, often called windows, which form the cell walls. In open-celled foams, some of the windows are open or torn in each cell, thus forming an interconnecting network open to fluid flow (liquid or gas). However, conventional polyurethane foams are not sufficiently porous or open-celled to allow significant fluid flow through the foam structure.

Reticulation relates to methods for removing or breaking the cell windows of polyurethane foams. Mechanical, chemical and thermal methods for reticulating foams are known. As one example, a foam may be reticulated by melting the windows with a high temperature flame front or explosion, which still leaves the strand network intact. Alternatively, the cell windows may be etched away using the hydrolyzing action of water in the presence of an alkali metal hydroxide. See U.S. Pat. Nos. 3,125,542; 3,405,217; 3,423,338; 3,425,890 and 4,670,477 for descriptions of various reticulating methods for polyurethane foams.

Household cleaning sponges and mop heads most commonly are formed from cellulose. Paper pulp is the primary ingredient for cellulose sponges. The pulp is reacted with carbon disulfide to form a soluble cellulose xanthate compound. This compound is dissolved into a honey-like liquid viscose and mixed with reinforcing fibers to add strength to the pulp mixture. The cellulose is formed with a double cell structure to replicate natural sea sponges. Sodium sulfate crystals are added to the pulp, and this mixture is heated in a mold to melt the crystals. Heating regenerates the mix to pure cellulose and leaves the signature sponge holes where the crystals have melted away. Bleaching chemicals and humectants maintain the moisture level and color purity of the cellulose sponge. While the cellulose has good water absorption and wicking, it has lower wet integrity than other materials. Moreover, upon drying, the cellulose becomes hard and brittle such that it must be pre-wet before using for wiping.

Open celled ester and ether polyurethane foams have greater softness and flexibility than cellulose, and retain flexibility upon drying without humectants. As compared to cellulose, foams have greater wet strength, better wet integrity and exhibit less swelling when wet. Foams also can be foamed to have a double cell structure to more resemble natural sea sponges. Generally, polyurethane foams can be produced more cheaply than cellulose. However, polyurethane foams are hydrophobic, lacking good liquid absorption and wicking characteristics, which makes them less suitable for household sponges and mop heads. Even after the polyurethane foams are post-treated with surfactants in an attempt to improve water absorption and wicking, they still do not match the performance of cellulose for these properties.

U.S. Pat. No. 6,756,416 discloses chemically reticulated ester polyurethane foams that have liquid absorption and wicking characteristics comparable, if not superior to, cellulose sponges. After the ester polyurethane foams are chemically treated in a caustic solution, they have water absorption rates of at least 20 pounds of water per square foot per minute. Such foams also have greater water holding capacity and wet strength than cellulose.

Often in designing sponges for household consumer and industrial applications, multiple material layers are combined together to offer additional properties and alter sponge appearance. For example, a hydrophilic ester polyurethane layer may be combined with a layer of nonwoven or another polymeric layer, such as a melamine or a polyethylene foam. When foams and other layers are bonded together, some manufacturers prefer that the bond be transparent to the consumer. In other words, consumers prefer sponges that do not have a stiff glue line between layers.

One foam joining method without glue or adhesive is flame lamination. A surface of a foam layer is heated to a temperature sufficient to locally melt and repolymerize the foam. The foam layer is then joined to a second layer while the surface is polymerized. Upon cooling, the melted surface hardens to form the bond between the foam layer and the second layer. Non-hydrophilic ester polyurethane foams are commonly recognized to give a stronger flame lamination bond than ether polyurethane foams. See U.S. Pat. Nos. 5,900,087 and 5,891,928. On the other hand, flame lamination using hydrophilic ester polyurethanes has seldom been practiced, and its limitations rarely studied.

When flame-laminated, non-hydrophilic ester polyurethane foams typically have a bond strength of over 10 oz/inch [109 N/m], as measured by tear strength test method ASTM D3574. By contrast, the hydrophilic ester foams typically have lower bond strengths, such as in the range of 4 to 9 oz./inch [43.8 to 98.5 N/m]. Although this lower bond strength could be satisfactory for some applications if it were uniform across a substrate and predictable, the bond strength appears to vary with the relative humidity of the process area. As the relative humidity increases, the bond strength drops to unacceptably low levels, particularly at the outer edges of the surface to be laminated.

Industry thus seeks ways to improve flame lamination for hydrophilic ester polyurethane foams.

One approach to improving flame lamination bonding uses a sacrificial non-hydrophilic ester foam layer between layers sought to be joined. This approach has been used when bonding ether polyurethane foam layers together because some ether polyurethane foams are known to form only very weak flame lamination bonds by themselves. A sacrificial foam layer typically is not required when bonding ester polyurethane foams because non-hydrophilic ester foams in general are considered flame laminable. Nevertheless, this has not been true for hydrophilic ester polyurethane foams. In view of the lower bond or tear strength exhibited and the adverse effects of relative humidity, improvements for flame lamination bonding of hydrophilic ester polyurethane foams continue to be sought.

SUMMARY OF THE INVENTION

In a first aspect, the invention is a method for flame bonding a hydrophilic ester polyurethane foam to a substrate to form a laminate structure. At least the face surface of a sacrificial sheet is heated to soften or repolymerize said surface. The heated face surface of the sacrificial sheet is then contacted with a surface of a sheet of hydrophilic ester polyurethane foam. The reverse surface of the sacrificial sheet is then contacted with a surface of the substrate to which the hydrophilic ester polyurethane foam is to be bonded to form a resulting laminate structure in which the sacrificial sheet has a thickness of no more than about 1.5 mm, preferably no more than about 1 mm.

The sacrificial sheet may be a film, sheet or foam. Preferably, the sacrificial sheet is a foam that has a starting thickness of no more than about one millimeter. Most preferably, the sacrificial sheet is a nonhydrophilic ester polyurethane foam with a density of 90 lb/ft$^3$ or less, and with a pore size from about 3 to 200 ppi, preferably from 70 ppi to 200 ppi. To achieve an aesthetically pleasing flame lamination bond, the sacrificial sheet is substantially consumed by the flame bonding.

In a two-step or pre-bonding flame lamination method, one surface of the sacrificial sheet may be pre-bonded to a surface of the hydrophilic foam sheet. Then, the reverse surface of the sacrificial sheet may be heated to soften or repolymerize the surface material before contacting the substrate for bonding. In a one-step or in situ flame lamination method, the face surface and the reverse surface of the sacrificial sheet are concurrently heated to soften the material. In either the one-step or two-step lamination methods, preferably the hydrophilic ester polyurethane foam is bonded to the substrate without using any auxiliary adhesives.

The substrate to which the hydrophilic ester polyurethane foam is bonded using the sacrificial sheet may comprise one of a variety of materials, such as a melamine or melamine-formaldehyde foam, a polyether polyurethane foam, a polyester polyurethane foam, a polymeric nonwoven, a textile fabric, an ethylene vinyl acetate (EVA) sheet or film, a polyolefin sheet or film, an acrylic sheet or film, a polyvinylchloride (PVC) sheet or film, a reticulated foam, a fleece, a cellulose sheet, a metallic sheet, a wood, pulp or pulp and fiber composite, a combination of polymers, and/or a polyester/polyamide/rayon fabric.

In a second aspect, the laminate structures and articles made with such laminate structures are disclosed. Articles that may be made from the laminate structure include household and industrial sponges and mop heads. The flame lamination with a sacrificial sheet does not adversely impact water absorption rates wicking capacity, water holding capacity and wet strength of the resulting absorbent article.

DESCRIPTION OF THE PREFERRED EMBODIMENTS

Hydrophilic ester foams are prepared preferably by mixing together the polyol component with the surfactants, catalysts, blowing agents and other additives, forming a polyol pre-mix. To the polyol pre-mix is added the isocyanate component. The foam mixture is then allowed to rise and cure, preferably under atmospheric conditions, to form the hydrophilic ester polyurethane foam. The foam-forming process may be carried out batch-wise, semi-continuously or continuously, and at atmospheric pressure, reduced pressure or elevated pressure.

Polyester polyurethane foams are more hydrophilic than polyether polyurethane foams due to the increased polarity of the carboxylic acid groups. Suitable polyester polyols for producing flexible polyester polyurethane foams are well known in the industry. Illustrative of such suitable polyester polyols are those produced by reacting a dicarboxylic and/or monocarboxylic acid with an excess of a diol and/or polyhydroxy alcohol, for example, adipic acid, glutaric acid, succinic acid, phthalic acid or anhydride, and/or fatty acids (linolic acid, oleic acid and the like) with diethylene glycol, ethylene glycol, propylene glycol, dipropylene glycol, 1,4-butanediol, neopentyl glycol, trimethylolpropane, trimethylolethane, and/or pentaerythritol. Examples of these polyols are LEXOREZ 1102-50 or LEXOREZ 1102-60 from Inolex Chemical Company or FOMREZ 50 or FOMREZ 60 from Crompton Corporation. Other suitable polyester polyols can be prepared by reacting a lactone with an excess of a diol such as caprolactone with propylene glycol. See U.S. Pat. No. 4,331,555 for further discussion of suitable polyester polyols. Preferably, the polyester polyol is made by reacting adipic acid and ethylene glycol monomers with a glycerin initiator Hydrophilic ester polyols are typically reaction products of polyethylene glycol and adipic acid. Examples are FOMREZ 45 from Crompton and LEXOREZ 1105-HV2 from Inolex Chemical Company. Most preferably, the polyol component of the foam-forming mixture comprises at least five (5) parts by weight, preferably ten (10) parts by weight, of a 50 hydroxyl hydrophilic ester polyol. 60 hydroxyl ester polyols and mixtures of 50 hydroxyl and 60 hydroxyl ester polyols and 50 hydroxyl hydrophilic ester polyols are also preferred.

The "hydroxyl number" for a polyol is a measure of the amount of reactive hydroxyl groups available for reaction. The value is reported as the number of milligrams of potassium hydroxide equivalent to the hydroxyl groups found in one gram of the sample. "Functionality" of a polyol is defined as the average number of hydroxyl group sites per molecule. Preferably, the polyester polyols used to form the foams of the present invention have a hydroxyl number in the range of 20 to 150, more preferably in the range of 40 to 100, and most preferably in the range of 50 to 60.

The term "polyisocyanate" refers particularly to isocyanates that have previously been suggested for use in preparing polyurethane foams. "Polyisocyanates" include di- and polyisocyanates and prepolymers of polyols and polyisocyanates having excess isocyanate groups available to react with additional polyol. The amount of polyisocyanate employed is frequently expressed by the term "index", which refers to the actual amount of isocyanate required for reaction with all of the active hydrogen-containing compounds present in the reaction mixture multiplied by 100. For most foam applications, the isocyanate index is in the range of between about 75 to 140. The preferred isocyanate index for preparing hydrophilic polyester polyurethane foam is in the range of 90 to 110, most preferably 100 or below, with a particularly preferred range of 95 to 98.

Polyester polyurethane foams are prepared using any suitable organic polyisocyanates well known in the art including, for example, hexamethylene diisocyanate, phenylene diisocyanate, toluene diisocyanate (TDI) and 4,4'-diphenylmethane diisocyanate (MDI). The methylene diisocyanates suitable for use are diphenyl methane diisocyanate and polymethylene polyphenyl isocyanate blends (sometimes referred to as "MDI" or "polymeric MDI"). The MDI blends can contain diphenylmethane 4,4'diisocyanate, as well as 2,2' and 2,4' isomers and higher molecular weight oligomers and have an isocyanate functionality of from about 2.1 to 2.7, preferably from about 2.1 to 2.5. Preferably, the isocyanate is selected from a commercial mixture of 2,4- and 2,6-toluene diisocyanate. A well-known commercial toluene diisocyanate is TD80, a blend of 80% 2,4 toluene diisocyanate and 20% 2,6 toluene diisocyanate. Polyisocyanates are typically used at a level of between 20 and 90 parts by weight per 100 parts of polyol, depending upon the polyol OH content and water content of the formulation.

One or more surfactants are also employed in the foam-forming composition. The surfactants lower the bulk surface tension, promote nucleation of bubbles, stabilize the rising cellular structure, emulsify incompatible ingredients, and may have some effect on the hydrophilicity of the resulting foam. The surfactants typically used in polyurethane foam applications are polysiloxane-polyoxyalkylene copolymers, which are generally used at levels between about 0.5 and 3 parts by weight per 100 parts polyol. From 1.0 to 3.0 parts by weight per 100 parts polyol of surfactant is preferred when making hydrophilic polyester polyurethane foam. Surfactants, which may for example be organic or silicone based, such as FOMREZ M66-86A (Crompton, formerly Witco) and L532 (GE Silicones, formerly OSi Specialties) may be used to stabilize the cell structure, to act as emulsifiers and to assist in mixing. Most preferably, the surfactant is a cell opening silicone surfactant in an amount from 1.5 to 2.5 parts by weight per 100 parts polyol.

Catalysts are used to control the relative rates of water-polyisocyanate (gas-forming or blowing) and polyol-polyisocyanate (gelling) reactions. The catalyst may be a single component, or in most cases a mixture of two or more compounds. Preferred catalysts for polyurethane foam production are organotin salts and tertiary amines. The amine catalysts are known to have a greater effect on the water-polyisocyanate reaction, whereas the organotin catalysts are known to have a greater effect on the polyol-polyisocyanate reaction. Total catalyst levels generally vary from 0 to 5.0 parts by weight per 100 parts polyol. The amount of catalyst used depends upon the formulation employed and the type of catalyst, as known to those skilled in the art. Although various catalysts may be used to prepare hydrophilic polyester polyurethane foams, we have found that the following ranges of catalyst amounts are satisfactory: amine catalyst from 0.5 to 2.0 parts, per 100 parts polyol; and organotin catalyst from 0 to 0.7 parts, preferably from 0 to 0.3 parts, per 100 parts polyol.

Suitable urethane catalysts are all those well known to the worker skilled in the art, including tertiary amines such as triethylenediamine, N-methylimidazole, 1,2-dimethylimidazole, N-methylmorpholine, N-ethylmorpholine, triethylamine, tributylamine, triethanolamine, dimethylethanolamine and bisdimethylaminodiethylether, and organotins such as stannous octoate, stannous acetate, stannous oleate, stannous laurate, dibutyltin dilaurate, and other such tin salts.

A double-cell structure may be created in the hydrophilic polyester polyurethane foam to replicate the appearance of natural sea sponges. Materials used to create a double cell structure may be added to the foam forming mixture. These include: castor oil derivatives, stearic acid, acetic acid and low melting point waxes. These materials create voids larger than the prevailing pores within the resulting foam structure. If used, the double-cell additive preferably is added in an amount from 0.04 to 0.21 parts per 100 parts polyol.

A blowing agent may be included in the foam-forming composition. The most typical blowing agent is water that may be added in amounts from 1.5 to 5.0 parts per 100 parts polyol. Alternative blowing agents are liquid carbon dioxide, volatile organic compounds, such as pentane and acetone, and chlorinated compounds, such as methylene chloride, HFC's, HCFC's and CFC's.

Optionally, other additives may be incorporated into the foam-forming composition. The optional additives include, but are not limited to, antimicrobial compounds, stabilizers, extenders, dyes, pigments, crosslinking additives, fragrances, detergents and anti-static agents. Such additives should not have a detrimental effect on the properties of the final polyurethane foam. For sponge and mop head applications, preferably an antimicrobial compound is added in an amount from 0.5 to 1.5 parts per 100 parts polyol.

The hydrophilic ester polyurethane foam has cell sizes preferably ranging from 70 to 130 pores per linear inch (27.6 to 51 pores per cm), most preferably 70 to 90 pores per linear inch (27.6 to 35.4 pores per cm), but may also have a double cell or sea sponge-like structure. The preferred double cell structure has a distribution of larger and medium sized cells scattered across a background of finer cells. The larger cells may range from 0.06 to 0.09 inches (1.5 to 2.3 mm) in diameter.

The foam is then chemically reticulated to remove cell windows by immersing the slab in a heated caustic bath for from three to fifteen minutes, preferably from six to ten minutes. One preferred caustic bath is a sodium hydroxide solution (from 5.0 to 10.0 percent, preferably 7.5% NaOH) that is heated to from 70° F. to 160° F. [21° C. to 71° C.], preferably from 120° F. to 160° F. [49° C. to 71° C.]. The caustic solution etches away at least a portion of the cell windows within the foam cellular structure, leaving behind a hydrophilic ester polyurethane foam. The treated foam is compressed between calendaring rolls, and then rinsed thoroughly and oven dried. As a result of such treatment, the hydrophilicity of the foam increases.

After treating, the foam optionally may be felted by compressing the foam to from one-half (½) to one-twentieth (1/20) of its initial thickness, preferably from one-third (⅓) to one-eighth (⅛) of its initial thickness, and heating the compressed foam at a temperature of from 340 to 380° F. (171 to 193° C.) for from 10 to 60 minutes. The compression ratio is generally referred to as a firmness. For example, a foam compressed to one-third of its original thickness is a firmness 3 felt. A foam compressed to one-fifth of its original thickness is a firmness 5 felt.

To create a sponge or mop head or other absorbent article, a layer of the hydrophilic polyester polyurethane foam frequently will be joined to another substrate of a similar or different composition. Such substrates may include, but are not limited to: a melamine or melamine-formaldehyde foam, a polyether polyurethane foam, a polyester polyurethane foam, a polymeric nonwoven, a textile fabric, an ethylene vinyl acetate (EVA) sheet or film, a polyolefin sheet or film, an acrylic sheet or film, a polyvinylchloride (PVC) sheet or film, a reticulated foam, a fleece, a cellulose sheet, a metallic sheet, a wood, pulp or pulp and fiber composite, a combination of polymers and/or polyester/polyamide (e.g., nylon)/rayon fabrics. Preferably, the hydrophilic polyester polyurethane foam has a thickness in the range of 5 to 20 mm, and the substrate has a thickness in the range of 10 to 35 mm. A particularly preferred substrate for a sponge or mop head is a melamine foam with a thickness in the range of 10 to 35 mm.

The surface of a sheet of hydrophilic polyester polyurethane foam tends to absorb moisture from any source, including moisture present in humid air. While not wishing to be bound by any one theory, we believe this surface moisture inhibits flame laminability of hydrophilic polyester polyurethane foams, leading to poor or inconsistent bond strength along the length of a sample.

We have found that the hydrophilic polyester polyurethane foam may be bonded to a substrate by flame lamination with a sacrificial sheet. By "sacrificial" is meant that the sheet used to improve bonding has a thickness such that substantially or completely all of the sheet melts and repolymerizes when heated by flame or other heating means during the flame lamination. "Substantially all" of the sheet has melted or burned away under heat from the flame when only up to about 1.5 mm, preferably up to about 1 mm, of sheet material thickness remains in the bonded laminate after flame lamination is completed.

A particularly preferred sacrificial sheet is a foam, such as an ester polyurethane, and most preferably is a non-hydrophilic ester polyurethane foam with an isocyanate index of 105 to 115. The isocyanate for making such ester polyurethane for the sacrificial foam can be toluene diisocyanate (TDI), methylene diisocyanate (MDI), a polyisocyanate, or a mixture thereof. The sacrificial sheet may have a density up to 90 lb/ft$^3$. Preferably, when the sacrificial sheet is a foam sheet, such foam has a density up to 20 lb/ft$^3$, with an isocyanate index of 90 to 125 and a pore size range of 3 to 200 ppi. Most preferably, the sacrificial foam sheet has a finer pore size, such as 70 ppi or higher.

The sacrificial sheet may also be a web or film formed of a polyester material, such as a poly(ethylene terephthalate) film or a MYLAR polyester film available from Dupont Teijin Films.

The sacrificial sheet can be applied in-situ or pre-bonded. In the in-situ or one-step process, the sacrificial sheet is placed in between the ester polyurethane foam layer and the substrate layer. Upon softening, the faces are placed into contact, preferably under pressure applied by nip rollers, with a face of the hydrophilic ester polyurethane foam and a face of the substrate to which said foam is to be bonded. Only one flame is employed to heat the sacrificial sheet, resulting in a high efficiency process.

In the pre-bonded or multi-step process, the sacrificial sheet is laminated to either the ester polyurethane foam or the substrate layer and is not totally burnt off during the pre-bonding step. First, one face of the sacrificial sheet is heated so as to melt or soften the surface. This heated face is placed into contact, preferably under pressure, with a face of the hydrophilic ester polyurethane foam to apply the sacrificial sheet to said hydrophilic ester polyurethane foam. Second, the remaining exposed face of the sacrificial sheet is heated so as to melt or soften that face before it is placed into contact, preferably under pressure, with a face of the substrate to which the hydrophilic ester polyurethane foam is to be bonded. This process allows for easier alignment of the various layers but requires two lamination steps After either of the one-step or multi-step flame lamination method is completed, the polymer material of the sacrificial sheet cools and repolymerizes to bond the hydrophilic ester polyurethane foam and the additional substrate together. After bonding is completed, as a result of the flame lamination method, preferably the cooled sacrificial sheet has a thickness of no more than one millimeter. Most preferably, this bonding layer is substantially invisible to the human eye upon unassisted visual inspection of the bonded article because substantially all of the polymer material of the sacrificial sheet is burnt off during the flame lamination.

The starting or pre-bonding thickness of the sacrificial foam sheet preferably is less than about one millimeter, or in the range of 0.020 to 0.040 inch [0.51 to 1.02 mm]. Most preferably, the sacrificial foam sheet has a thickness of about 0.030 inch [0.76 mm]. We have found that during flame lamination, about 0.020 to 0.040 inch [0.51 to 1.02 mm] of foam thickness can be burnt away.

The resulting laminate has a bond strength preferably above about 7 oz/inch [76.6 N/m]; and such bond strength is substantially uniform across the surface of the substrate within a standard deviation of about 0.6 oz/inch [6.7 N/m].

The invention is further illustrated, but not limited, by the following examples.

EXAMPLES

Example 1

A hydrophilic polyurethane foam was prepared on a laboratory scale by mixing together the foam-forming ingredients and pouring them into a 15"×15" (38.1×38.1 cm) cardboard box to form foam buns under atmospheric pressure (e.g., 1 atm.) and temperature (about 75° F. (24° C.)). Portions of the foam bun for each Example were cut into slabs and chemically treated or modified. The slabs were immersed in a heated solution of 7.5% sodium hydroxide in water (heated to at least 120° F. (49° C.)) for eight minutes. The slabs were then compressed between calendar rollers to squeeze out most of the caustic solution. The slabs were then rinsed to remove the remaining caustic solution and then dried in an oven.

One formulation for making a hydrophilic ester polyurethane foam used here was:

| | | |
|---|---|---|
| 1102-50A | 90 | parts |
| F45 | 10 | parts |
| B8301 | 1.5 | parts |
| DM50 | 0.8 | parts |
| Water | 2.9 | parts |
| NEM | 2 | parts |
| K29 | 0.12 | parts |
| TD80 | 41.9 | parts |
| Index | 115 | |

The resulting foam had a density of 2.0 to 2.2 pcf [32 to 35.2 kg/m$^3$], and pore size of 70 ppi [27.6 pores/cm].

LEXOREZ 1102-50A is an ester polyol with a hydroxyl number of 50 supplied by Inolex Chemical Company. F45 is FOMREZ 45, a 50 hydroxyl hydrophilic ester polyol offered by Crompton. TEGOSTAB B8301 is a cell opening silicone surfactant from Goldschmidt Chemical Corporation. ULTRAFRESH DM50 is an antimicrobial additive supplied by Thomson Research. KOSMOS K29 is a stannous octoate catalyst (tin catalyst) from Goldschmidt Chemical Corporation. NEM is an amine catalyst, n-ethyl morpholine. TD80 is a toluene diisocyanate mixture comprised of 80 percent 2,4-toluene diisocyanate and 20 percent 2,6-toluene diisocyanate. The "index" is the isocyanate index. The cellular structure of the foam can be uniform or have a distribution of different cell sizes. The uniform cell structure is described by the number of pores per linear inch. The number is derived from a visual comparison of the foam to a standard.

Optionally, a double cell additive may be added. One double cell additive is a castor oil derivative used to provide an optional sea sponge like structure to the foam. Double-cell foams have cells of varying sizes.

The sacrificial sheet in this example was a non-hydrophilic polyester polyurethane foam made from the following formulation:

| | | |
|---|---|---|
| 1102-50F | 100.0 | parts |
| SE232 | 1.4 | parts |
| Water | 4.25 | parts |
| K29 | 0.02 | parts |
| A31 | 0.64 | parts |
| TD80 | 49.2 | parts |
| Index | 99 | |

LEXOREZ 1102-50A is an ester polyol with a hydroxyl number of 50 supplied by Inolex Chemical Company. SE232 is a stabilizing surfactant from OSi Specialties. KOSMOS K29 is a stannous octoate catalyst (tin catalyst) from Goldschmidt Chemical Corporation. Niax A31 is an amine catalyst from OSi Specialties. TD80 is a toluene diisocyanate mixture comprised of 80 percent 2,4-toluene diisocyanate and 20 percent 2,6-toluene diisocyanate. The cellular structure of the foam can be uniform or can have a distribution of different cell sizes.

This non-hydrophilic ester polyurethane foam was then skived to form a sacrificial foam sheet with a thickness of 0.030 inch [0.76 mm], a width of about 51 inches [130 cm] and an indeterminate length. The sacrificial foam sheet was heated under a flame (1.5 inch [3.81 cm] wide, traversing speed 30 to 40 ft/min [9.1 to 12.2 m/min], temperature from 300 to 400° C.) for less than one second and then compressed between the faces of a hydrophilic polyester foam sheet and a melamine-formaldehyde foam sheet by the action of nip rolls.

The hydrophilic polyester foam sheet was unrolled from a roll of indeterminate length, and had a thickness of 7 mm and a width of 51 inches [130 cm]. The melamine-formaldehyde foam sheet had a thickness of 22 mm and a width of 52 inches [130 cm] and length of 100 inches [254 cm]. The melamine foam was obtained from BASF under the trademark BASOTECT, and had a density of 0.7 pcf [11.2 kg/m$^3$].

For comparison, the hydrophilic polyester foam sheet was heated by the flame (temperature from 300 to 400° C.) and laminated to the melamine-formaldehyde foam sheet without using a sacrificial foam.

Bond strength or tear strength was determined according to the tear resistance test (test method F set out in ASTM D3574). In this test, samples having dimensions of 10 inch by 1 inch [25.4 cm by 2.54 cm] were cut from the laminated sheets. When cutting, the 10 inch [25.4 cm] dimension is oriented parallel to the length of the laminate. The laminated layers are separated at one end of the sample strip to form 1 inch [2.54 cm] long flaps. The ends of the flaps are inserted into the jaws of a test unit that pulls the flaps away from one another. After rupture of the specimen or at least a 50 mm length is torn, the maximum force in ounces was reported. Three samples are tested and the mean value is reported. The tear strength/bond strength is calculated based on the force divided by the thickness in inches, and was reported as ounces per inch.

TABLE 1

Distribution of bond strength across a laminate made with a sacrificial layer

| Left Edge | Center | Right Edge | Range |
|---|---|---|---|
| 7.6 oz/inch | 7.3 oz/inch | 7.7 oz/inch | 0.4 oz/inch |
| 7.3 oz/inch | 7.0 oz/inch | 8.1 oz/inch | 1.1 oz/inch |
| 7.6 oz/inch | 7.7 oz/inch | 6.9 oz/inch | 0.8 oz/inch |
| 7.9 oz/inch | 7.7 oz/inch | 7.5 oz/inch | 0.4 oz/inch |
| 7.9 oz/inch | 7.5 oz/inch | 7.9 oz/inch | 0.4 oz/inch |
| 7.7 oz/inch | 7.4 oz/inch | 7.6 oz/inch | 0.6 oz/inch |
| average | average | average | average |

TABLE 2

Distribution of bond strength across a laminate made without a sacrificial layer

| Left Edge | Center | Right Edge | Range |
|---|---|---|---|
| 2 oz/inch | 4 oz/inch | 2 oz/inch | 2 oz/inch |
| 3 oz/inch | 5 oz/inch | 2 oz/inch | 3 oz/inch |
| 6 oz/inch | 9 oz/inch | 6 oz/inch | 3 oz/inch |
| 7 oz/inch | 9 oz/inch | 6 oz/inch | 3 oz/inch |
| 3 oz/inch | 5 oz/inch | 2 oz/inch | 3 oz/inch |
| 4.2 oz/inch average | 6.4 oz/inch | 3.6 oz/inch | 2.8 oz/inch |

Comparing the results from Table 1 with those from Table 2, the bond strengths for the flame-laminated structure made without a sacrificial foam layer (Table 2) vary widely across the dimensions of the structure. Higher bond strengths were recorded for samples cut from the center of the laminate structure as compared to the right and left edges. The standard deviation was also high—the values ranged by 2 to 3 ounces/inch [21.9 to 32.8 N/m]. By contrast, on average higher and much more uniform bond strengths were measured for the flame-laminated structure made with the sacrificial foam layer (Table 1). The bond strengths were from 7 to 8 oz/inch [76.6 to 87.6 N/m], and did not vary to the same degree across the dimensions of the laminate. The standard deviation averaged 0.6 oz/inch [6.6 N/m].

The sacrificial foam flame bonding method had no appreciable adverse effect on the hydrophilic properties of the bonded article, in terms of water absorption rate, wicking capacity, water holding capacity and wet strength. Thus, the hydrophilic foam portion of a sponge made as a laminate of hydrophilic polyester polyurethane foam with a melamine foam had a water absorption rate of at least 20 pounds of water per square foot per minute, and a water holding capacity of at least 25 grams per gram of foam.

Example 2

Table 2 sets out data showing the variability of bond strength that resulted at different relative humidities when hydrophilic ester polyurethane foams were flame lamination bonded to melamine foam substrates without a sacrificial sheet. To simulate the most humid conditions, the surfaces of the hydrophilic ester polyurethane foam and the melamine foam were alternately sprayed with a water spray as noted in Table 2.

TABLE 2

| Sample | A | B | C | D | E | F | G | H |
|---|---|---|---|---|---|---|---|---|
| Ester polyurethane | | | | | | | | |
| Surface humidity | 48% | 65% | 50% | 90% | 30% | Water sprayed at 0.014 g/in$^2$ | Water sprayed at 0.030 g/in$^2$ | 50% |
| Temperature | 72° F. | 83° F. | 70° F. | 120° F. | 70° F. | 70° F. | 70° F. | 70° F. |
| Melamine Foam | | | | | | | | |
| Surface humidity | 48% | 65% | 50% | 90% | 90% | 50% | 50% | Water sprayed at 0.030 g/in$^2$ |
| Temperature | 72° F. | 83° F. | 70° F. | 120° F. | 120° F. | 70° F. | 70° F. | 70° F. |
| Sacrificial Layer | No | No | No | No | No | No | No | No |
| Laminator | Commercial | Commercial | Small | Small | Small | Small | Small | Small |
| Bond strength oz/inch | 8.00 | 2.88 | 5.28 | 4.8 | 5.92 | 1.6 | 0 | 4.96 |

Table 3 sets out data showing that flame lamination with a sacrificial foam sheet improved bond strength over varying relative humidities. In Examples J, K and L according to the invention, the sacrificial foam sheet was a nonhydrophilic ester polyurethane foam with a thickness of 0.030 inch [0.76 mm], pore size of 70 ppi [27.6 pores/cm] and density of 1.60 lb/ft$^3$ [25.6 kg/m$^3$].

TABLE 3

| Sample | I | J | K | L |
|---|---|---|---|---|
| Ester polyurethane | | | | |
| Surface humidity | 48% | 50% | 90% | Water sprayed at 0.014 g/in$^2$ |
| Temperature | 72° F. | 70° F. | 120° F. | 70° F. |
| Melamine foam | | | | |
| Surface humidity | 48% | 50% | 90% | 50% |
| Temperature | 72° F. | 70° F. | 120° F. | 70° F. |
| Sacrificial Layer | No | Yes | Yes | Yes |
| Laminator | Commercial | Small | Small | Small |
| Bond Strength (oz/inch) | 7.68 | 7.36 | 7.5 | 4.8 |

When the hydrophilic ester polyurethane foam was exposed to high relative humidity, such as in Example K, the bonding with the sacrificial layer achieved a bond strength comparable to that of flame lamination at low humidity (Example J). By contrast, Example D (Table 2) under the same conditions but without a sacrificial foam layer showed a drop in bond strength. Even when a heavy water spray was applied to the surface of the hydrophilic ester polyurethane foam, an improved bond was obtained by flame laminating with the sacrificial foam layer.

The invention has been illustrated by detailed description and examples of the preferred embodiments. Various changes in form and detail will be within the skill of persons skilled in the art. Therefore, the invention must be measured by the claims and not by the description of the examples or the preferred embodiments.

We claim:
1. A laminate structure, comprising:
a hydrophilic ester polyurethane foam sheet,
a sacrificial sheet of a nonhydrophilic ester polyurethane foam with a density of 90 lb/ft$^3$ or less, and
a substrate,
wherein the hydrophilic ester polyurethane foam sheet is bonded to the substrate by flame bonding,
wherein said flame bonding heats and repolymerizes the sacrificial sheet of a nonhydrophilic ester polyurethane foam to join a face surface of said sacrificial sheet to a surface of the hydrophilic ester polyurethane foam sheet and to join a reverse surface of the sacrificial sheet to a surface of the substrate to thereby form the laminate structure of the hydrophilic ester polyurethane foam sheet, the repolymerized sacrificial sheet and the substrate;
such that the hydrophilic ester polyurethane foam sheet is bonded uniformly to the substrate surface with a bond strength of at least about 7 oz/inch (76.6 N/m) with standard deviation of about 0.6 oz/inch (6.7 N/m).

2. The laminate structure of claim 1, wherein the sacrificial sheet has a starting thickness of no more than about one millimeter.

3. The laminate structure of claim 2, wherein the sacrificial sheet has a starting thickness of from about 0.5 to about 1 mm.

4. The laminate structure of claim 1, wherein the sacrificial sheet is substantially consumed by the flame bonding.

5. The laminate structure of claim 1, wherein the sacrificial sheet is substantially melted or burned away.

6. The laminate structure of claim 1, wherein the sacrificial sheet has a pore size from 70 ppi to 200 ppi.

7. The laminate structure of claim 1, wherein the substrate comprises a material selected from the group consisting of: a melamine or melamine-formaldehyde foam, a polyether polyurethane foam, a polyester polyurethane foam, a polymeric nonwoven, a textile fabric, an ethylene vinyl acetate (EVA) sheet or film, a polyolefin sheet or film, an acrylic sheet or film, a polyvinylchloride (PVC) sheet or film, a reticulated foam, a fleece, a cellulose sheet, a metallic sheet, a wood, pulp or pulp and fiber composite, a combination of polymers, and a polyester/polyamide/rayon fabric.

8. The laminate structure of claim 1, wherein the hydrophilic ester polyurethane foam sheet is bonded to the substrate without auxiliary adhesives.

9. An absorbent article comprising the laminate structure of claim 1.

* * * * *